United States Patent
Burke et al.

(10) Patent No.: US 7,228,847 B2
(45) Date of Patent: Jun. 12, 2007

(54) COVER ASSEMBLY FOR FUEL TANK

(75) Inventors: David H. Burke, Flint, MI (US);
Joanne Tersigni, Vassar, MI (US);
Sharon Beyer, Grand Blanc, MI (US);
William Zimmerman, Grand Blanc,
MI (US); Ulf Sawert, Grand Blanc, MI
(US); Tom R. Paveglio, Flushing, MI
(US); Christopher J. Czyzio, Flushing,
MI (US)

(73) Assignee: Delphi Technologies, Inc., Troy, MI (US)

( * ) Notice: Subject to any disclaimer, the term of this patent is extended or adjusted under 35 U.S.C. 154(b) by 421 days.

(21) Appl. No.: 10/836,674

(22) Filed: Apr. 30, 2004

(65) Prior Publication Data

US 2005/0241845 A1   Nov. 3, 2005

(51) Int. Cl.
*B60K 15/05* (2006.01)

(52) U.S. Cl. .................................. 123/509; 220/562

(58) Field of Classification Search .............. 137/560, 137/574, 576; 123/509; 220/4.14, 562
See application file for complete search history.

(56) References Cited

U.S. PATENT DOCUMENTS

| 4,654,191 | A |   | 3/1987  | Krieg |
|---|---|---|---|---|
| 4,678,097 | A |   | 7/1987  | Crute |
| 4,780,063 | A |   | 10/1988 | Tuckey |
| 5,018,546 | A |   | 5/1991  | Carmack et al. |
| 5,056,492 | A | * | 10/1991 | Banse ..................... 123/509 |
| 5,070,849 | A |   | 12/1991 | Rich et al. |
| 5,218,942 | A |   | 6/1993  | Coha et al. |
| 5,762,049 | A |   | 6/1998  | Jones et al. |
| 5,785,032 | A |   | 7/1998  | Yamashita et al. |
| 5,791,317 | A |   | 8/1998  | Eck |
| 5,988,213 | A |   | 11/1999 | Yoshioka |
| 6,062,203 | A | * | 5/2000  | Takahashi et al. ........ 123/509 |
| 6,213,100 | B1|   | 4/2001  | Johansen |
| 6,220,227 | B1| * | 4/2001  | Okada et al. ............ 123/509 |
| 6,360,765 | B1| * | 3/2002  | Pozgainer ............... 123/509 |
| 6,367,650 | B1|   | 4/2002  | Kuehnemund et al. |
| 6,405,753 | B1|   | 6/2002  | Beyer et al. |
| 6,669,043 | B2| * | 12/2003 | Fish et al. ............... 220/4.14 |
| 6,675,778 | B1| * | 1/2004  | Kemper et al. .......... 123/509 |
| 6,783,336 | B2| * | 8/2004  | Kempfer et al. ......... 123/509 |
| 6,964,264 | B2| * | 11/2005 | Yoshioka ................. 123/509 |
| 2002/0070217 | A1 | * | 6/2002 | Sawert et al. ............ 220/562 |
| 2003/0094458 | A1 | * | 5/2003 | Beyer et al. ............. 220/562 |

* cited by examiner

*Primary Examiner*—John Rivell
(74) *Attorney, Agent, or Firm*—Paul L. Marshall

(57) ABSTRACT

A cover assembly for a fuel tank of a vehicle includes a cover made of a metal material adapted to close an opening in the fuel tank having a fuel reservoir disposed therein and an insert molded to the cover to form a plurality of members to allow components to be attached thereto. The insert is integral, unitary, and one-piece.

12 Claims, 3 Drawing Sheets

COVER ASSEMBLY FOR FUEL TANK

TECHNICAL FIELD

The present invention relates generally to fuel tanks for vehicles and, more particularly, to a cover assembly for a fuel tank of a vehicle.

BACKGROUND OF THE INVENTION

It is known to provide a fuel tank in a vehicle to hold fuel to be used by an engine of the vehicle. In such a fuel tank, a fuel delivery module is provided with a cover to seal the opening through which the fuel delivery module has been assembled into the fuel tank. In some cases, the fuel delivery module consists only of a cover/flange to which either an electrical fuel pump and/or a mechanism for indicating fuel is attached. Recently, the trend has been to construct fuel delivery modules with an integral fuel reservoir. Various valves, sensors, pressure regulators, as well as filters have been added over time. Several of these components have been mounted or attached to the cover. Typically, the cover has fuel tubes, an electrical connector, and a rollover valve attached thereto. The cover is made entirely out of either a metal material or a plastic material.

Each material for the cover has its advantages and disadvantages. For example, the metal material for the cover is stronger and has the lowest permeation of fuel vapors. However, the metal material for the cover may produce leaks when fabricated, cannot provide many features, and is relatively costly to make. On the other hand, the plastic material for the cover is easy to produce without leaks, easier to provide many features, and is cheaper. However, the plastic material has a relatively high permeability when used with fuels and is weaker in strength than metal material.

Therefore, it is desirable to provide a cover assembly for a fuel tank that reduces permeation of fuel therethrough. It is also desirable to increase the strength of a cover assembly for a fuel tank. It is further desirable to provide a plurality of molded features in a cover assembly for a fuel tank, which reduces the component part count and number of assembly operations. Therefore, there is a need in the art to provide a cover assembly that meets these desires.

SUMMARY OF THE INVENTION

Accordingly, the present invention is a cover assembly for a fuel tank of a vehicle including a cover made of a metal material adapted to close an opening in the fuel tank having a fuel reservoir disposed therein and an insert molded to the cover to form a plurality of members to allow components to be attached thereto. The insert is integral, unitary, and one-piece.

One advantage of the present invention is that a new cover assembly is provided for a fuel tank of a vehicle that includes a metal cover insert molded into a plastic cover. Another advantage of the present invention is that the cover assembly has a metal cover and a plastic carrier used in conjunction with the metal cover to minimize permeation and to increase strength. Yet another advantage of the present invention is that the cover assembly provides plastic molded features to a metal fuel cover for a fuel delivery module. A further advantage of the present invention is that the cover assembly reduces cost by reducing the component part count and number of assembly operations.

Other features and advantages of the present invention will be readily appreciated, as the same becomes better understood, after reading the subsequent description taken in conjunction with the accompanying drawings.

DESCRIPTION OF THE PREFERRED EMBODIMENT

Figure 1:
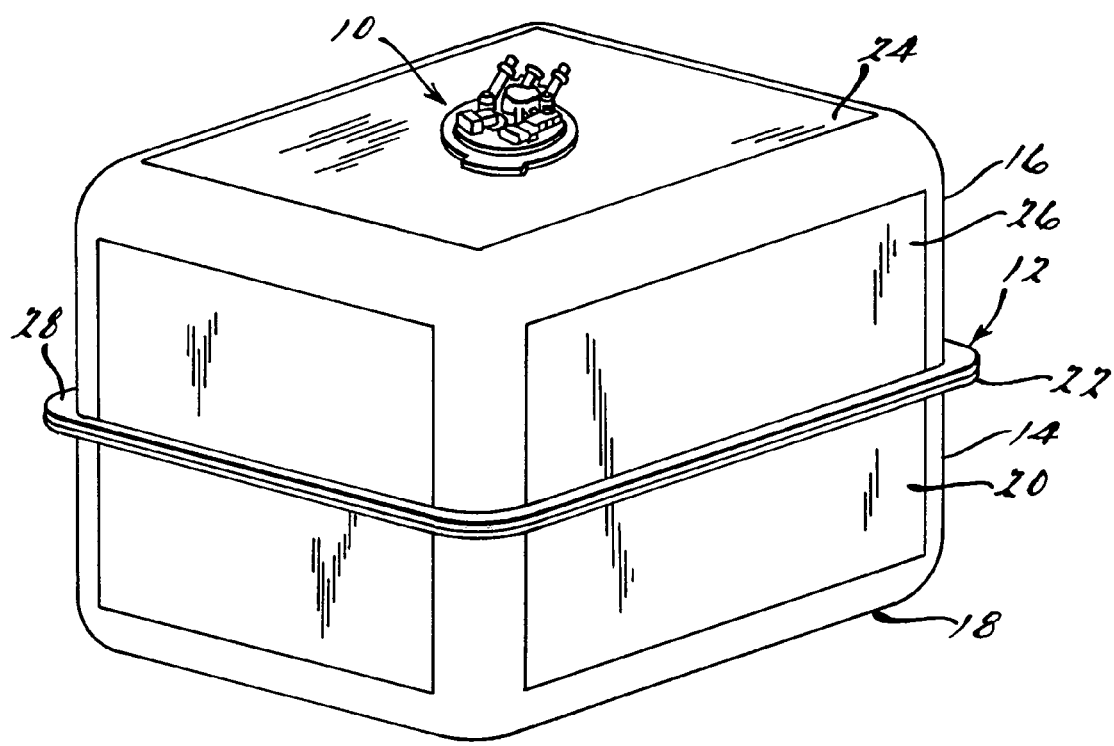
FIG. 1 is a perspective view of a cover assembly for a fuel delivery module, according to the present invention, illustrated in operational relationship with a fuel tank.
Figure 2:
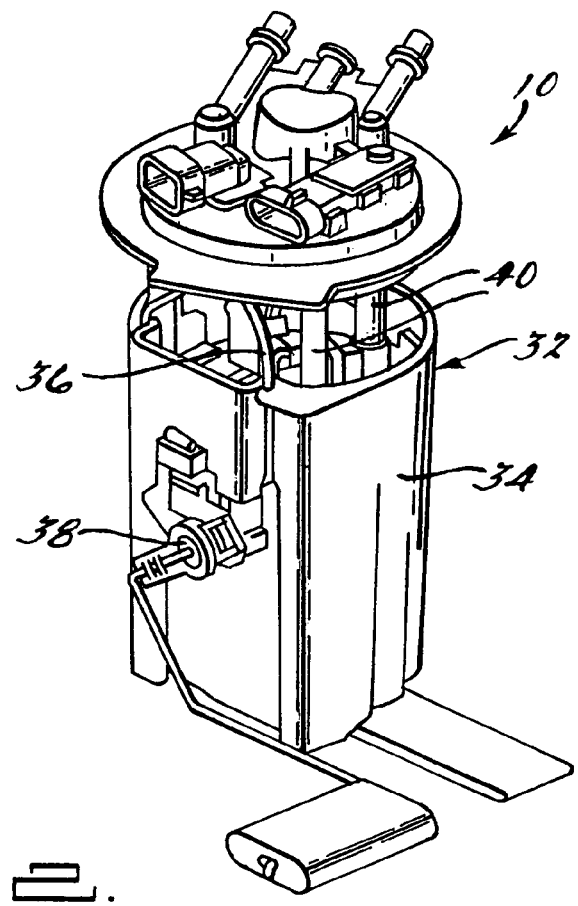
FIG. 2 is a perspective view of the cover assembly and fuel delivery module of FIG. 1.
Figure 3:
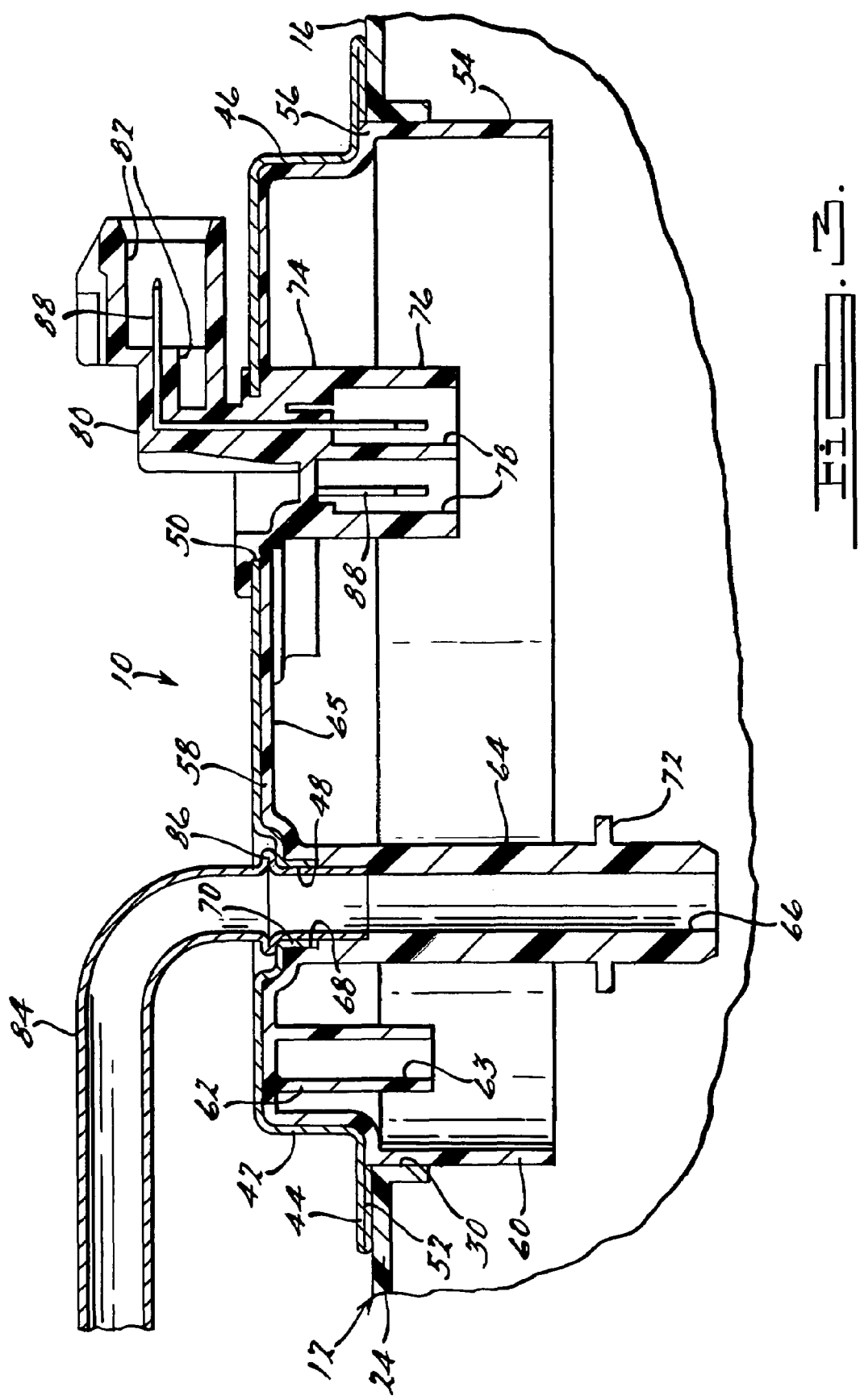
FIG. 3 is a fragmentary elevational view of the cover assembly of FIG. 1.

Referring to the drawings and in particular FIGS. 1 through 3, one embodiment of a cover assembly 10, according to the present invention, is shown for a fuel tank 12 of a vehicle (not shown). In the embodiment illustrated, the fuel tank 12 includes a first or lower half shell 14 and a second or upper half shell 16. The lower half shell 14 has a base wall 18 and a side wall 20 around a periphery of the base wall 18 and extending generally perpendicular thereto. The side wall 20 has a flange 22 extending outwardly and generally perpendicular thereto. The upper half shell 16 has a base wall 24 and a side wall 26 around a periphery of the base wall 24 and extending generally perpendicular thereto. The side wall 26 has a flange 28 extending outwardly and generally perpendicular thereto. The flanges 22 and 28 of the lower half shell 14 and upper half shell 16, respectively, are joined together by suitable means such as by welding. The lower half shell 14 and upper half shell 16 are made of a rigid material such as plastic. The base wall 24 of the upper half shell 16 includes an opening 30 for the cover assembly 10. It should be appreciated that, except for the cover assembly 10, the fuel tank 12 is conventional and known in the art.

As illustrated in FIG. 2, the cover assembly 10 is part of a fuel delivery module, generally indicated at 32. The fuel delivery module 32 is disposed in the fuel tank 12 to deliver fuel from the fuel tank 12 to an engine (not shown) of the vehicle. The fuel delivery module 32 includes a reservoir assembly 34 having an electrical fuel pump 36 mounted therein. The fuel delivery module 32 also includes a fuel level indication mechanism 38 such as a rheostat connected to the reservoir assembly 34 for indicating the level of the fuel inside the fuel tank 12. The fuel delivery module 32 further includes a plurality of guide rods or tubes 40 to mechanically connect the cover assembly 10 with the reservoir assembly 34. It should be appreciated that, in other types of fuel delivery modules, there is no mechanical connection between the cover assembly 10 and the reservoir assembly 34 and this type of module requires a retaining mechanism on the bottom of the fuel tank 12.

Referring to FIG. 3, the cover assembly 10 includes a cover 42 to cover or close the opening 30. The cover 42 is generally circular in shape. The cover 42 includes a base wall 44 having a raised portion 46. The raised portion 46 has at least one, preferably a plurality of apertures 48, 50 extending therethrough for a function to be described. The cover 42 also includes a flange wall 52 extending underneath and generally parallel to the base wall 44. The cover 42 is made from a metal material such as steel. Preferably, the cover 42 is a stamped steel cover.

The cover assembly 10 also includes an insert 54 molded to the cover 42. The insert 54 is generally circular in shape. The insert 54 has a base wall 50 that is generally planar and circular in shape. The base wall 56 has a raised portion 58 for a function to be described. The base wall 56 is disposed adjacent the base wall 44 of the cover 42 and the raised portion 58 is disposed adjacent the raised portion 46 of the cover 42. The insert 54 also includes a side wall 60 extending generally perpendicular from the base wall 56. The side wall 60 forms a skirt of the cover assembly 10.

The insert 54 includes at least one, preferably a plurality of guide rod retaining bosses 62. The guide rod retaining bosses 62 are generally cylindrical and circular in shape. The guide rod retaining bosses 62 have a cavity 63 extending axially therein to receive and retain the guide rods 40. The guide rod retaining bosses 62 extend axially from an interior surface 65 of the raised portion 58 of the insert 54. It should be appreciated that the guide rod retaining bosses 62 provide rotational flexibility in the attachment of the cover assembly 10 with the reservoir assembly 34. It should also be appreciated that the guide rod retaining bosses 62 are optional and that the guide rods 40 may be molded directly to the cover 42.

The carrier 58 may include at least one, preferably a plurality of tube end-forms 64 disposed about at least one of the apertures 48 in the cover 42 and extending axially for a function to be described. The tube end-form 64 is generally cylindrical and circular in shape. The tube end-form 64 has a passageway 66 extending therethrough. The tube end-form 64 extends axially from the interior surface 65 of the raised portion 58 of the insert 54. The tube end-form 64 has a stepped recess 68 at an upper end to receive a stepped flange 70 of the cover 42 forming the aperture 48. The tube end-form 64 has a flange 72 extending radially and annularly near a lower end thereof.

The insert 54 also includes an electrical connector 74 extending into and through the aperture 50 of the cover 42. The electrical connector 74 has an interior portion 76 that is generally cylindrical and circular in shape. The interior portion 76 has at least one, preferably a plurality of cavities 78 extending axially therein for a function to be described. The interior portion 78 extends axially from an interior surface 65 of the raised portion 58 of the insert 54. The electrical connector 74 has an exterior portion 80 that is generally cylindrical and inverted "L" in shape. The exterior portion 80 has at least one, preferably a plurality of cavities 82 extending radially therein for a function to be described. The exterior portion 80 extends axially from the raised portion 58 of the insert 54. It should be appreciated that the interior portion 76 and exterior portion 80 are integral, unitary, and one-piece.

The insert 54 is made from a plastic material such as a polyethylene. It should be appreciated that the insert 54 is a monolithic structure being integral, unitary, and one-piece.

The cover assembly 10 may include at least one, preferably a plurality of fuel tubes 84 extending into and through the apertures 48 of the cover 42. The fuel tubes 84 are made of a metal material. The fuel tube 84 has a projection or flange 86 extending radially and abutting the stepped flange 70 to limit the insertion of the fuel tube 84 through the aperture 48 and into the passageway 66 of the tube end-form 64. The fuel tubes 84 are connected or assembled to the cover 42 by suitable means such as brazing, soldering, welding, or mechanical retention.

The cover assembly 10 may include at least one, preferably a plurality of electrical terminals 88 extending into the electrical connector 74. The electrical terminals 88 are made of a metal material. The electrical terminals 88 extend into the cavities 78 and 82 of the interior portion 76 and exterior portion 80. It should be appreciated that the electrical terminals 88 are insert molded into the electrical connector 74. It should also be appreciated that the insert 54 may be extended to other components such as pressure regulators, pressure relief valves, etc.

Figure 4:
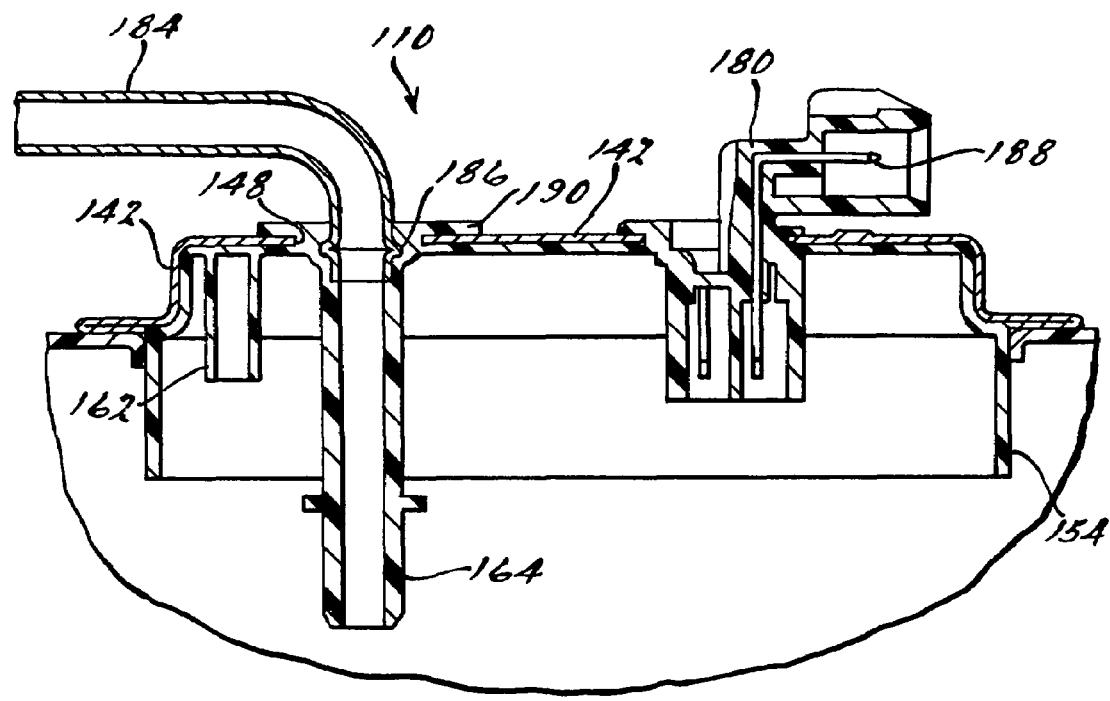
FIG. 4 is a fragmentary elevational view of another embodiment, according to the present invention, of the cover assembly of FIG. 1.

Referring to FIG. 4, another embodiment, according to the present invention, of the cover assembly 10 is shown. Like parts of the cover assembly 10 have like reference numerals increased by one hundred (100). In this embodiment, the cover assembly 110 includes the metal cover 142 and plastic insert 154. The plastic insert 154 has the guide rod retaining bosses 162, the tube end-forms 164, and the electrical connector 174. The cover assembly 110 also includes the fuel tubes 184 and electrical terminals 188. However, the metal fuel tubes 184 are insert molded to the insert 154. The cover 142 eliminates the stepped flange about the aperture 148. The insert 154 has an end portion 190 extending axially from the tube end-form 164 through the aperture 148 and radially over a portion of the raised portion 142 of the cover 142. The end portion 190 is disposed about the projection 186 of the fuel tube 184 to retain the fuel tube 184 therein. It should be appreciated that the operation of the cover assembly 110 is similar to the cover assembly 10.

Figure 5:
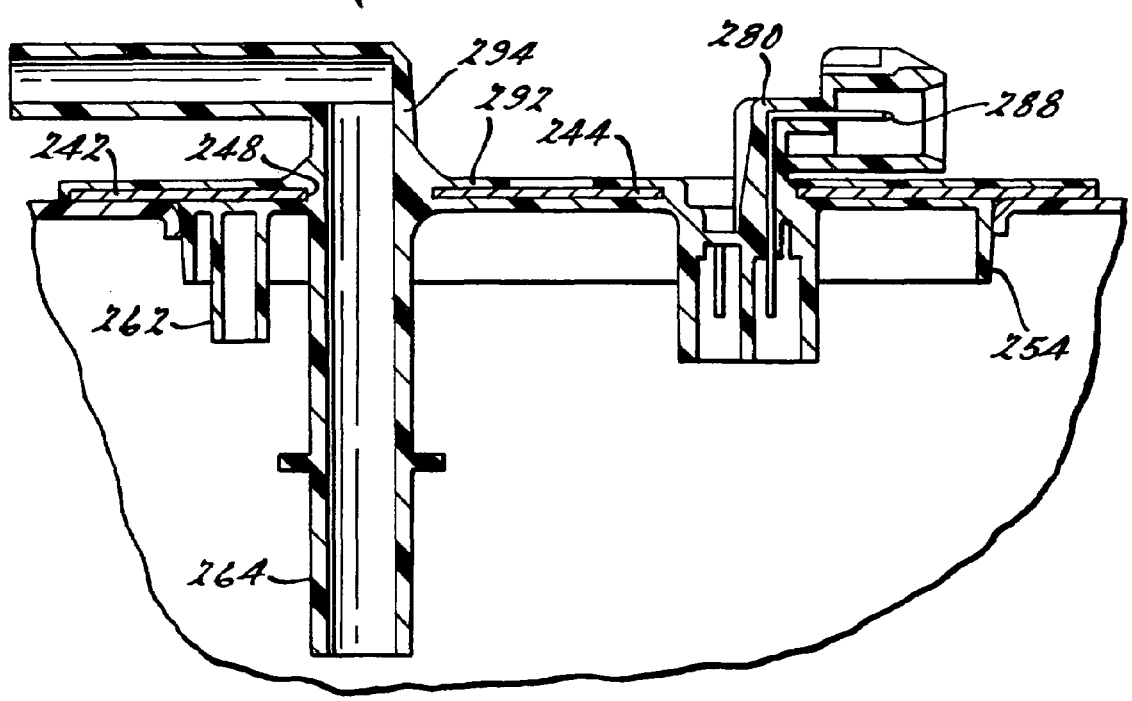
FIG. 5 is a fragmentary elevational view of yet another embodiment, according to the present invention, of the cover assembly of FIG. 1.

Referring to FIG. 5, yet another embodiment, according to the present invention, of the cover assembly 10 is shown. Like parts of the cover assembly 10 have like reference numerals increased by two hundred (200). In this embodiment, the cover assembly 210 includes the metal cover 242 and plastic insert 254. The plastic insert 254 has the guide rod retaining bosses 262, the tube end-forms 264, and the electrical connector 274. The cover assembly 110 also includes the electrical terminals 288. The cover 242 eliminates the raised portion and stepped flange about the aperture 248. The cover 242 includes a generally planar base wall 244. The base wall 244 is a punched plate with minimal plating requirements. The insert 254 has an upper wall portion 292 extending radially over the cover 242. The insert 254 also has a fuel tube portion 294 extending axially from the tube end-form 264 through the aperture 248 and forms a generally inverted "L" shape. The tube end-form 264 and fuel tube portion 294 are integral, unitary, and one-piece to form a molded fuel tube. It should be appreciated that the operation of the cover assembly 210 is similar to the cover assembly 10. It should also be appreciated that the cover assembly 210 reduces the manufacturing processes to those of a current production plastic cover.

Accordingly, the cover assembly 10, 110, 210 provides 100% of the metal cover's strength and is insert molded to add several complex features in one molding step. Although the cover assembly 10, 110, 210 goes through all of the metal cover manufacturing steps (brazing, welding, and plating) and added assembly steps are eliminated by molding the skirt, guide-boss (or complete guide rod), undercover tube end-form, and electrical connector tight into the cover. It should be appreciated that other features may be molded such as latches for a fuel limiting vent valve (not shown) and/or grade vent valve, or even the valve body for the fuel limiting vent valve or grade vent valve.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A cover assembly for a fuel tank of a vehicle comprising:
   a cover made of a metal material and adapted to close an opening in the fuel tank having a fuel reservoir disposed therein, said cover having an inner side and an outer side and having at least two apertures; and
   an insert made of a plastic material and comprising a fuel tube connector at one of said apertures and an electrical connector at another of said apertures, said insert being integral, unitary, and one-piece and molded about the cover such that a portion is against the inner side and a portion is against the outer side with the cover interposed therebetween.

2. A cover assembly as set forth in claim 1 wherein said insert has a base wall and a side wall extending from said base wall.

3. A cover assembly as set forth in claim 1 wherein said insert further comprises at least one guide rod retaining boss extending from said base wall and having a cavity therein to receive a guide rod of the fuel reservoir.

4. A cover assembly as set forth in claim 1 wherein said fuel tube connector comprises a tube end-form extending from said base wall and having a passageway extending therethrough to receive a fuel tube.

5. A cover assembly as set forth in claim 4 wherein said tube end-form is adapted to receive an end of a fuel tube to retain said fuel tube to said insert.

6. A cover assembly for a fuel tank of a vehicle comprising:
   a metal cover adapted to close an opening in the fuel tank having a fuel reservoir disposed therein, said metal cover having at least two apertures; and
   a plastic insert molded to said cover such that the cover is substantially enclosed within the insert, said insert being integral, unitary, and one-piece and having a fuel tube connector at one of said apertures and an electrical connector at another of said apertures.

7. A cover assembly as set forth in claim 6 wherein said insert has a base wall and a side wall extending from said base wall.

8. A cover assembly as set forth in claim 7 wherein said insert further comprises at least one guide rod retaining boss extending from said base wall and having a cavity therein to receive a guide rod of the fuel reservoir.

9. A cover assembly as set forth in claim 7 wherein said fuel tube connector comprises a tube end-form extending from said base wall and having a passageway extending therethrough to receive a fuel tube communicating with at least one of said apertures.

10. A cover assembly as set forth in claim 9 wherein said tube end-form is adapted to receive an end of a fuel tube to retain said fuel tube to said insert.

11. A fuel tank for a vehicle comprising:
    a fuel tank having an opening formed in a wall thereof;
    a fuel reservoir disposed through said opening and into said fuel tank;
    a cover assembly operatively connected to said fuel reservoir to close said opening; and
    wherein said cover assembly comprises
    a cover made of a metal material and adapted to close an opening in the fuel tank having a fuel reservoir disposed therein, said cover having an inner side and an outer side and having at least two apertures; and
    an insert made of a plastic material and comprising a fuel tube connector at one of said apertures and an electrical connector at another of said apertures, said insert being integral, unitary, and one-piece and molded about the cover such that a portion is against the inner side and a portion is against the outer side with the cover interposed therebetween.

12. A fuel tank assembly comprising:
    a fuel tank having a wall with at least one opening formed therein;
    a cover assembly operatively connected to a valve assembly to close said at least one opening; and
    wherein said cover assembly comprises
    a metal cover adapted to close an opening in the fuel tank having a fuel reservoir disposed therein, said metal cover having at least two apertures; and
    a plastic insert molded to said cover such that the cover is substantially enclosed within the insert, said insert being integral, unitary, and one-piece and having a fuel tube connection at one of said apertures and an electrical connection at another of said apertures.

* * * * *